(12) United States Patent
Zaloga et al.

(10) Patent No.: US 9,156,494 B2
(45) Date of Patent: Oct. 13, 2015

(54) VEHICLE STEERING SYSTEMS

(71) Applicant: GM GLOBAL TECHNOLOGY OPERATIONS LLC, Detroit, MI (US)

(72) Inventors: Miroslaw Zaloga, Shelby Township, MI (US); Marco E. Rodriguez, Macomb Township, MI (US); Christopher J. Mielke, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 14/057,009

(22) Filed: Oct. 18, 2013

(65) Prior Publication Data

US 2015/0108746 A1    Apr. 23, 2015

(51) Int. Cl.
*B62D 5/06* (2006.01)
*B62D 5/18* (2006.01)
*B62D 3/00* (2006.01)
*B62D 3/04* (2006.01)
*B62D 3/06* (2006.01)

(52) U.S. Cl.
CPC .. *B62D 5/18* (2013.01); *B62D 3/00* (2013.01); *B62D 3/04* (2013.01); *B62D 3/06* (2013.01); *B62D 5/062* (2013.01)

(58) Field of Classification Search
CPC ............. B62D 5/18; B62D 5/062; B62D 3/00
USPC ........................... 180/417, 426, 441; 280/773
See application file for complete search history.

(56) References Cited

U.S. PATENT DOCUMENTS

| | | | | |
|---|---|---|---|---|
| 2,757,643 | A * | 8/1956 | Hunter | 137/596 |
| 2,953,932 | A * | 9/1960 | Lincoln | 74/388 PS |
| 3,241,630 | A * | 3/1966 | Snabes et al. | 180/405 |
| 5,803,201 | A * | 9/1998 | Sheppard | 180/429 |
| 6,070,483 | A * | 6/2000 | Gilbert | 74/409 |
| 6,394,219 | B1 * | 5/2002 | Gilbert et al. | 180/441 |
| 6,896,093 | B2 * | 5/2005 | Ishikawa et al. | 180/417 |
| 7,240,760 | B2 * | 7/2007 | Sherwin | 180/421 |
| 7,290,637 | B2 * | 11/2007 | Nagata et al. | 180/439 |
| 2006/0011406 | A1 * | 1/2006 | Ishikawa et al. | 180/426 |
| 2007/0137923 | A1 * | 6/2007 | Dennis | 180/417 |
| 2008/0093155 | A1 * | 4/2008 | Ishikawa et al. | 180/426 |
| 2012/0241242 | A1 * | 9/2012 | Ishikawa et al. | 180/441 |
| 2013/0048410 | A1 * | 2/2013 | Ishikawa et al. | 180/441 |
| 2014/0116173 | A1 * | 5/2014 | Rodriquez et al. | 74/422 |
| 2014/0345965 | A1 * | 11/2014 | Ura | 180/404 |

* cited by examiner

*Primary Examiner* — Paul N Dickson
*Assistant Examiner* — Darlene P Condra
(74) *Attorney, Agent, or Firm* — Quinn Law Group PLLC

(57) ABSTRACT

A steering system for a vehicle includes a sector shaft defining a bore therein and rotatable about a central longitudinal axis. The steering system also includes a lash adjuster translatable within the bore along the central longitudinal axis. In addition, the steering system includes an end cap cover abutting the lash adjuster and spaced apart from the sector shaft to define a first cavity between the end cap cover and the sector shaft, and a housing abutting the end cap cover and spaced apart from the sector shaft to define a second cavity between the housing and the sector shaft. The steering system also includes a seal surrounding and abutting the sector shaft, wherein the seal separates the first cavity from the second cavity.

20 Claims, 4 Drawing Sheets

US 9,156,494 B2

VEHICLE STEERING SYSTEMS

TECHNICAL FIELD

The disclosure relates to a steering system for a vehicle.

BACKGROUND

Steering systems for vehicles may include a sector shaft rotatable against a rack ball nut to thereby steer vehicle wheels in a desired direction. More specifically, a steering wheel of the vehicle may rotate between an on-center position and an off-center position and thereby rotate the sector shaft with respect to the rack ball nut via intermeshing gear teeth. As such, alignment of the sector shaft with respect to the rack ball nut contributes to the effectiveness and ease of operation of the steering system.

SUMMARY

A steering system for a vehicle includes a sector shaft defining a bore therein and rotatable about a central longitudinal axis. The steering system also includes a lash adjuster translatable within the bore along the central longitudinal axis. In addition, the steering system includes an end cap cover abutting the lash adjuster and spaced apart from the sector shaft to define a first cavity between the end cap cover and the sector shaft. Further, the steering system includes a housing abutting the end cap cover and spaced apart from the sector shaft to define a second cavity between the housing and the sector shaft. The steering system also includes a seal surrounding and abutting the sector shaft, wherein the seal separates the first cavity from the second cavity.

In another embodiment, a steering system for a vehicle includes a steering wheel rotatable between an on-center position and an off-center position, and a sector shaft having a plurality of gear teeth each protruding therefrom along a respective one of a plurality of gear axes. The sector shaft has a proximal end defining a bore therein and is rotatable about a central longitudinal axis that is substantially perpendicular to each of the plurality of gear axes as the steering wheel rotates between the on-center position and the off-center position. The steering system also includes a rack ball nut having a plurality of cogs extending therefrom and defining a plurality of grooves therebetween, wherein each of the plurality of gear teeth is matable with a respective one of the plurality of grooves. Further, the steering system includes a lash adjuster translatable within the bore along the central longitudinal axis. The steering system also includes an end cap cover abutting the lash adjuster and spaced apart from the sector shaft to define a first cavity between the end cap cover and the sector shaft. In addition, the steering system includes a housing abutting the end cap cover and spaced apart from the sector shaft to define a second cavity between the housing and the sector shaft. The steering system also includes a seal surrounding and abutting the sector shaft, wherein the seal separates the first cavity from the second cavity so that the first cavity is not disposed in fluid communication with the second cavity. Further, the steering system includes a fluid disposed in contact with the sector shaft and the rack ball nut within the second cavity. The fluid is not disposed within the first cavity and does not exert hydraulic pressure on the proximal end so that each of the plurality of gear teeth is spaced apart from a respective one of the plurality of cogs as the steering wheel rotates from the on-center position to the off-center position. A center one of the plurality of gear teeth meshes with a center one of the plurality of grooves to define a first gap having a first thickness between the center one of the plurality of gear teeth and one of the plurality of cogs when the steering wheel is disposed in the on-center position. An outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position.

A vehicle includes an axle, and a plurality of wheels each rotatable about the axle. The vehicle also includes a steering system configured for pivoting the axle about a central longitudinal axis to thereby steer the plurality of wheels. The steering system includes a sector shaft defining a bore therein and rotatable about the central longitudinal axis. The steering system also includes a lash adjuster translatable within the bore along the central longitudinal axis. Further, the steering system includes an end cap cover abutting the lash adjuster and spaced apart from the sector shaft to define a first cavity between the end cap cover and the sector shaft. In addition, the steering system includes a housing abutting the end cap cover and spaced apart from the sector shaft to define a second cavity between the housing and the sector shaft. The steering system also includes a seal surrounding and abutting the sector shaft, wherein the seal separates the first cavity from the second cavity.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
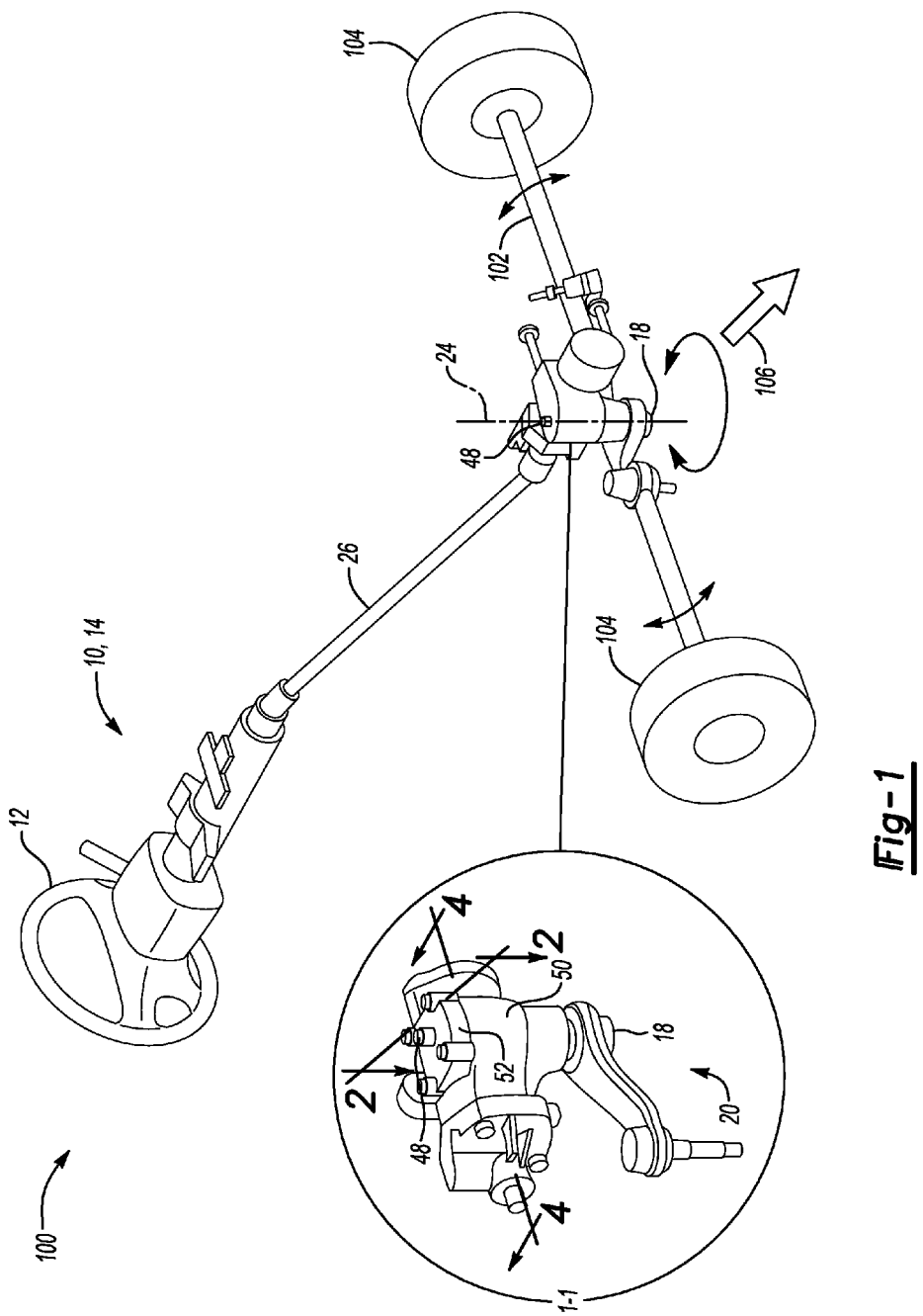
FIG. 1 is a schematic perspective illustration of a vehicle including a steering system, wherein the steering system includes a steering wheel and an integral gear, shown enlarged at circle 1-1, having a sector shaft and a rack ball nut.

Referring to the Figures, wherein like reference numerals refer to like elements, a steering system 10 for a vehicle 100 is shown generally in FIG. 1. The steering system 10 may be useful for vehicles 100, such as automotive vehicles, that require precise and efficient steering without steering wheel play, vehicle drift, or vehicle wander during steering maneuvers. Therefore, the steering system 10 may also be useful for non-automotive vehicles, such as, but not limited to, recreational vehicles.

Referring now to FIG. 1, the vehicle 100 includes an axle 102 and a plurality of wheels 104 each rotatable about the axle 102. That is, the plurality of wheels 104 may rotate about the axle 102 as the vehicle 100 travels in a desired direction 106. The vehicle 100 also includes the steering system 10 configured for pivoting the axle 102 about a central longitudinal axis 24 to thereby steer the plurality of wheels 104 and change the direction 106 of travel of the vehicle 100.

Figure 4A:
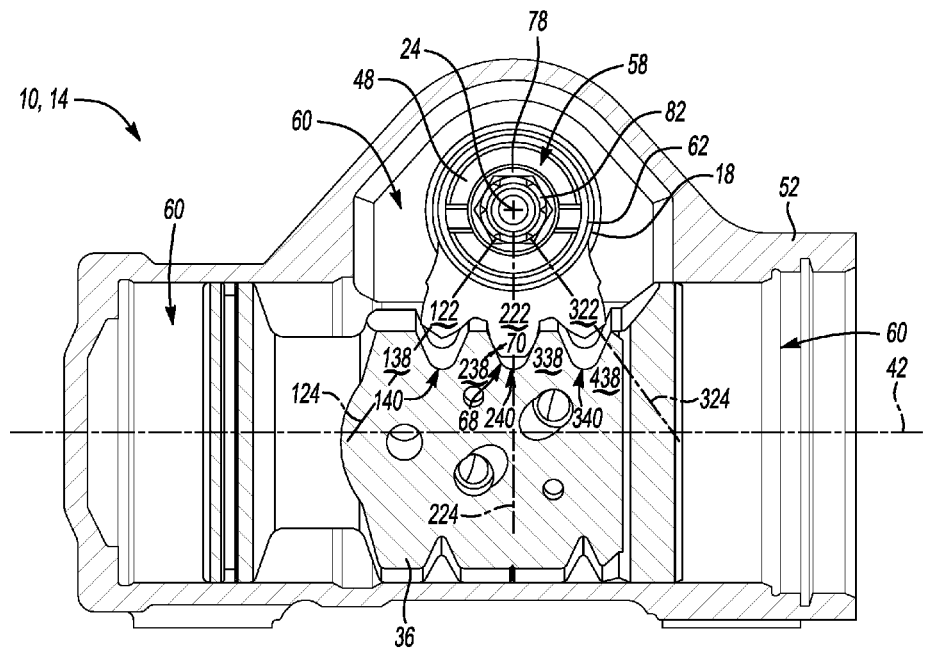
FIG. 4A is a schematic illustration of a top cross-sectional view of the sector shaft and rack ball nut of FIGS. 1-3 taken along section lines 4-4, wherein the sector shaft is disposed in an on-center position.
Figure 4B:
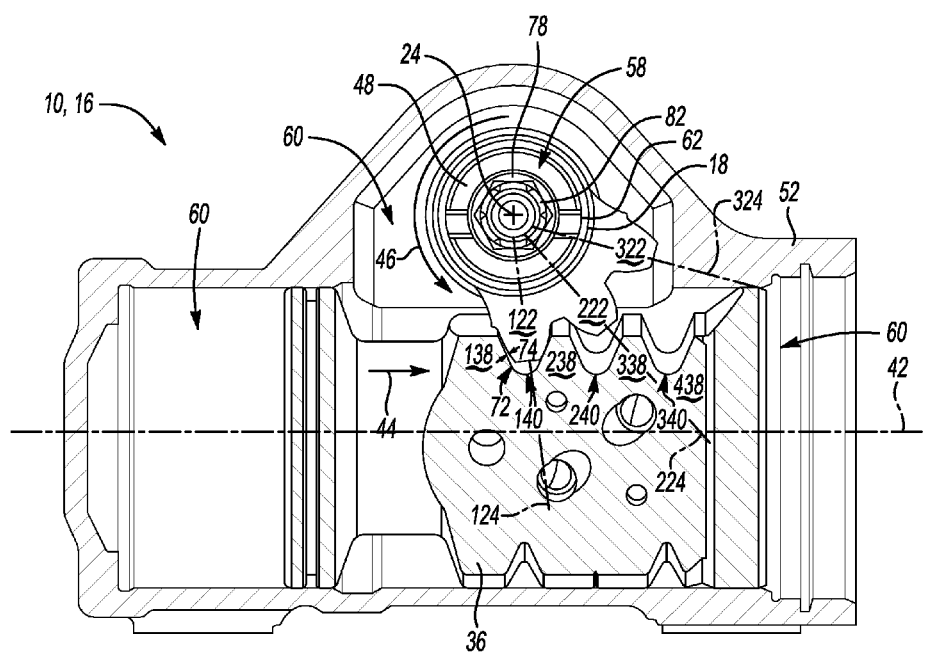
FIG. 4B is a schematic illustration of a top cross-sectional view of the sector shaft and rack ball nut of FIG. 4A, wherein the sector shaft is disposed in an off-center position.

With continued reference to FIG. 1, the steering system 10 may include a steering wheel 12 rotatable between an on-center position (shown generally at 14 in FIGS. 1 and 4A) and an off-center position (shown generally at 16 in FIG. 4B). That is, when disposed in the on-center position 14, the steering wheel 12 may orient each of the plurality of wheels 104 of the vehicle 100 parallel to every other wheel 104 so that the vehicle 100 does not turn, but rather travels along a straight path. Conversely, when disposed in the off-center position 16, the steering wheel 12 may turn the front wheels 104 of the vehicle 100 with respect to the rear wheels (not shown) of the vehicle 100 so that the vehicle 100 may steer through a left- or right-hand turn.

With continued reference to FIG. 1, the steering system 10 includes a sector shaft 18. The sector shaft 18 may be characterized as a Pitman shaft, and the steering system 10 may be generally characterized as a Pitman power steering system, as opposed to a rack and pinion power steering system (not shown). Further, the sector shaft 18 may be a component of an integral gear, which is shown enlarged at 20 in circle 1-1 of FIG. 1.

Figure 2:
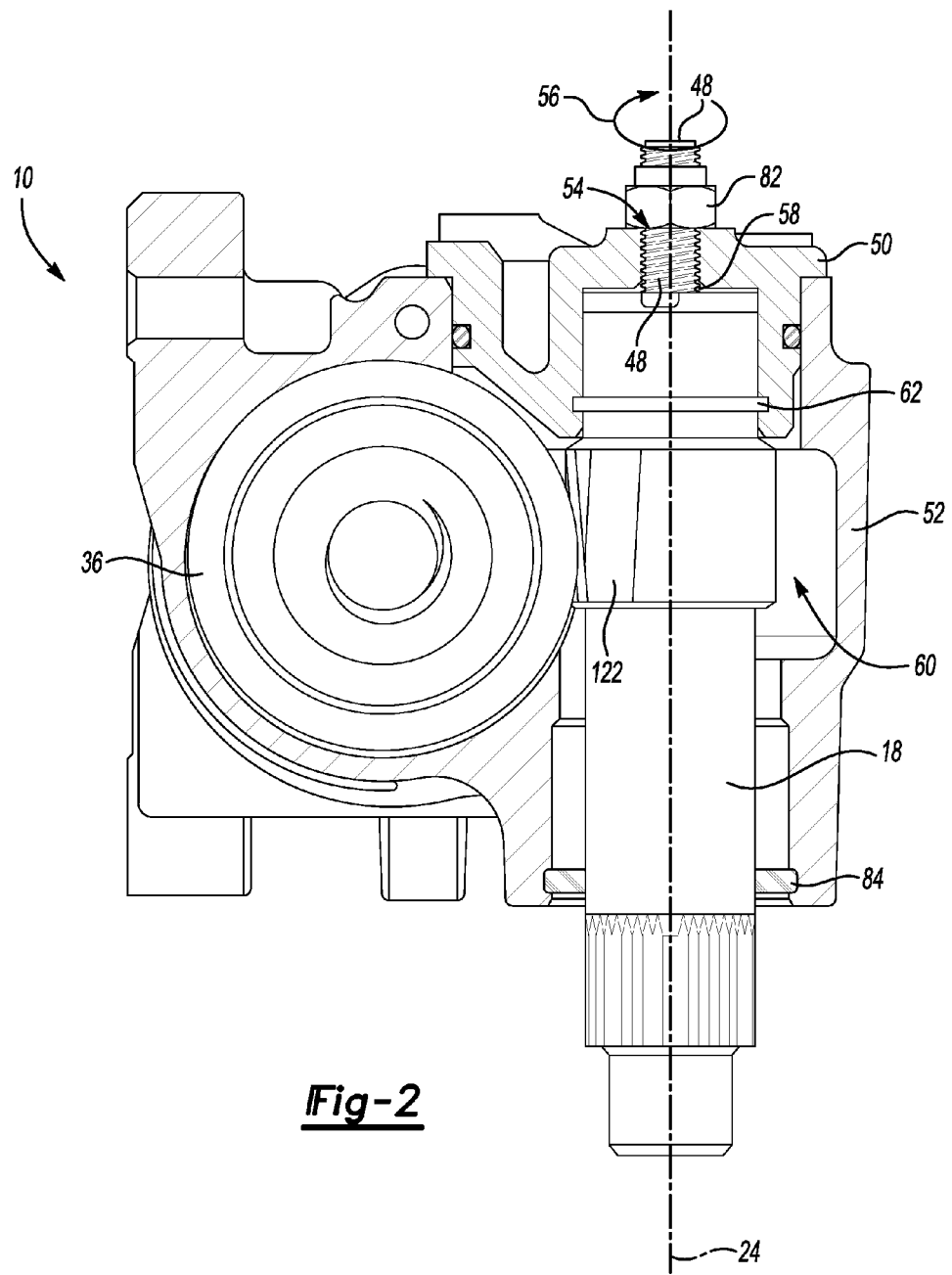
FIG. 2 is a schematic illustration of a cross-sectional view of the sector shaft and rack ball nut of FIG. 1 taken along section lines 2-2.

As best shown in FIGS. 4A and 4B, the sector shaft 18 may have a plurality of gear teeth 122, 222, 322 each protruding therefrom along a respective one of a plurality of gear axes 124, 224, 324. Although the sector shaft 18 may have any number of gear teeth 122, in one non-limiting example, the sector shaft 18 may have three gear teeth 122, 222, 322 each protruding therefrom along a respective one of three gear axes 124, 224, 324. Further, as best shown in FIG. 2, the sector shaft 18 is rotatable about the central longitudinal axis 24 that is substantially perpendicular to each of the plurality of gear axes 124, 224, 324 as the steering wheel 12 (FIG. 1) rotates between the on-center position 14 (FIG. 4A) and the off-center position 16 (FIG. 4B). That is, referring to FIG. 1, the sector shaft 18 may be operatively connected to the steering wheel 12 via one or more steering linkages 26 or components and may rotate about the central longitudinal axis 24 when the steering wheel 12 is turned from the on-center position 14 to the off-center position 16.

Figure 3:
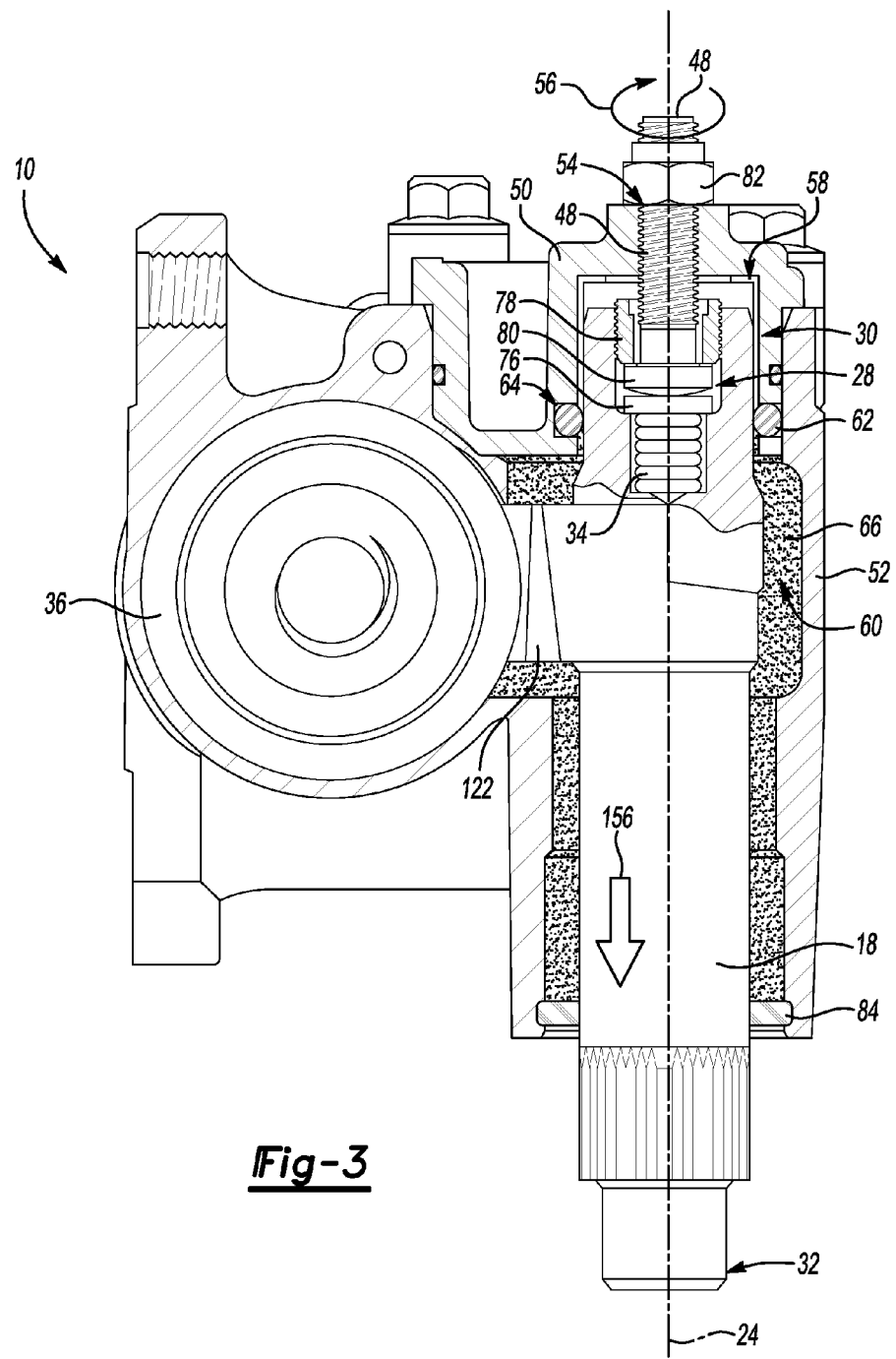
FIG. 3 is a schematic illustration of a cross-sectional and partially cut-away view of the sector shaft and rack ball nut of FIGS. 1 and 2.

Referring now to FIG. 3, the sector shaft 18 defines a bore 28 therein. More specifically, the sector shaft 18 may have a proximal end 30 defining the bore 28 therein, and a distal end 32 spaced apart from the proximal end 30 along the central longitudinal axis 24. The bore 28 may be configured for receiving a resilient member 34, as set forth in more detail below. Further, as set forth above, in one non-limiting example, the sector shaft 18 may include three gear teeth 122, 222, 322 (FIGS. 4A and 4B) each protruding from the proximal end 30 along a respective one of the plurality of gear axes 124, 224, 324 (FIGS. 4A and 4B).

Referring now to FIGS. 4A and 4B, the steering system 10 may also include a rack ball nut 36 having a plurality of cogs 138, 238, 338, 438 extending therefrom and defining a plurality of grooves 140, 240, 340 therebetween, wherein each of the plurality of gear teeth 122, 222, 322 is matable with a respective one of the plurality of grooves 140, 240, 340. Although the rack ball nut 36 may have any number of cogs 138, in one non-limiting example, the rack ball nut 36 may have four cogs 138, 238, 338, 438 extending therefrom and may define three grooves 140, 240, 340 therebetween. Therefore, each of the three gear teeth 122, 222, 322 may mate or mesh with a respective one of the plurality of three grooves 140, 240, 340 as the steering wheel 12 (FIG. 1) rotates between the on-center position 14 (FIG. 4A) and the off-center position 16 (FIG. 4B). More specifically, the steering wheel 12 may rotate between the on-center position 14 and the off-center position 16 to translate the rack ball nut 36 along an axis 42 that is substantially perpendicular to the central longitudinal axis 24, and thereby rotate the sector shaft 18 about the central longitudinal axis 24. That is, as best shown in FIG. 4B, the rack ball nut 36 may translate along the axis 42 in the direction of arrow 44 and thereby rotate the sector shaft 18 about the central longitudinal axis 24 in the direction of arrow 46.

Referring now to FIG. 2, the steering system 10 also includes a lash adjuster 48 translatable within the bore 28 (FIG. 3) along the central longitudinal axis 24. As set forth in more detail below, the lash adjuster 48 may be configured for minimizing lash between the plurality of gear teeth 122, 222, 322 (FIG. 4A) and the plurality of cogs 138, 238, 338, 438 (FIG. 4A) when the steering wheel 12 (FIG. 1) is disposed in the on-center position 14 (FIG. 4A). As used herein, the terminology "lash" describes any spacing or tolerance between a gear tooth 122 and a respective one 138 of the plurality of cogs 138, 238, 338, 438. That is, lash describes a condition in which a space exists between the faces of meshing gear teeth 122, 222, 322 and cogs 138, 238, 338, 438, i.e., in which the gear tooth 122 does not mesh with a respective one 138 of the plurality of cogs 138, 238, 338, 438 via an exact interference fit. Such lash requires additional wasted work input, e.g., turning the steering wheel 12 an additional number of degrees, to bring the gear teeth 122, 222, 322 and cogs 138, 238, 338, 438 into contact when changing direction 106 (FIG. 1) of the vehicle 100 (FIG. 1). The additional wasted work input may be described as unloaded rotation of the steering wheel 12 upon changing vehicle direction 106 or trying to maintain straight-line steering when the steering wheel 12 is disposed in the on-center position 14 (FIG. 4A). Lash may be felt by an operator of the vehicle 100 as imprecise steering, vehicle wander, vehicle pull or lead, lack of steering response, steering wheel play, and/or steering vagueness when the steering wheel 12 is disposed in the on-center position 14. As such, lash may be undesirable when the steering wheel 12 is disposed in the on-center position 14, and may be minimized by contact between the gear tooth 222 and the respective one 238, 338 of the plurality of cogs 138, 238, 338, 438 when the steering wheel 12 is disposed in the on-center position 14.

Referring again to FIG. 2, the steering system 10 further includes an end cap cover 50 and a housing 52. The end cap cover 50 may be bolted to the housing 52 of the integral gear 20 (FIG. 1) and as such, may be stationary or fixed with respect to the sector shaft 18 and the rack ball nut 36. Stated differently, the end cap cover 50 may not be rotatable about the central longitudinal axis 24. Further, the end cap cover 50 abuts the lash adjuster 48. In particular, the lash adjuster 48 may be inserted into an aperture 54 defined by the end cap cover 50 and may, for example, be threadably mated to the end cap cover 50 such that rotation of the lash adjuster 48 may compress the resilient member 34 (FIG. 3) along the central longitudinal axis 24. More specifically, the lash adjuster 48 may be rotatable with respect to the end cap cover 50, e.g., in a direction indicated by arrow 56, to translate the resilient member 34 along the central longitudinal axis 24 away from the proximal end 30 (FIG. 3), e.g., in a direction towards the distal end 32 (FIG. 3) as indicated by arrow 156 (FIG. 3).

Further, as best shown in FIG. 3, the end cap cover 50 is spaced apart from the sector shaft 18 to define a first cavity 58 between the end cap cover 50 and the sector shaft 18. Similarly, the housing 52 abuts the end cap cover 50 and is spaced apart from the sector shaft 18 to define a second cavity 60 between the housing 52 and the sector shaft 18.

As described with continued reference to FIG. 3, the steering system 10 also includes a seal 62 surrounding and abutting the sector shaft 18. For example, the end cap cover 50 may define an annular channel 64 therein, and the seal 62 may be disposed within the annular channel 64. More specifically, the seal 62 may be disposed at the proximal end 30 of the sector shaft between the first cavity 58 and the second cavity 60. As such, the seal 62 separates the first cavity 58 from the second cavity 60 so that the first cavity 58 is not disposed in fluid communication with the second cavity 60. The seal 62 may be formed from any material suitable for separating the first cavity 58 from the second cavity 60, e.g., an elastomer, and the seal 62 may be configured as a compressive O-ring.

In addition, as likewise shown in FIG. 3, the steering system 10 may also include a gasket 84 disposed at the distal end 32 of the sector shaft 18. More specifically, the gasket 84 may abut the sector shaft 18 to isolate the second cavity 60 from the ambient atmosphere external to the housing 52. That is, the gasket 84 may be configured to prevent fluid communication between the second cavity 60 and the ambient atmosphere. The gasket 84 may be formed from any material suitable for separating the second cavity 60 from the ambient atmosphere, e.g., an elastomer, and the gasket 84 may also be configured as a compressive O-ring.

Therefore, as best shown in FIG. 3, the steering system 10 may also include a fluid 66 disposed in contact with the sector shaft 18 within the second cavity 60. As such, the fluid 66 may also be disposed in contact with the rack ball nut 36 within the second cavity 60, and may be contained within the second cavity 60 by the seal 62 and the gasket 84. The fluid 66 may be a lubricating fluid, such as, for example, a hydraulic fluid or a valve fluid. In operation, the fluid 66 may lubricate moving components of the steering system 10 within the second cavity 60, e.g., the plurality of gear teeth 122, 222, 322 (FIGS. 4A and 4B) of the sector shaft 18 and elements of the rack ball nut 36. However, the fluid 66 may not be disposed within the first cavity 58. That is, the seal 62 separates the first cavity 58 from the second cavity 60 so that the fluid 66 may not flow from the second cavity 60 to the first cavity 58. In particular, the fluid 66 may not be disposed within the first cavity 58 when the steering wheel 12 (FIG. 1) is disposed in the on-center position 14 (FIG. 4A), and the fluid 66 may not be disposed within the first cavity 58 when the steering wheel 12 is disposed in the off-center position 16 (FIG. 4B). As such, the fluid 66 may not exert hydraulic pressure on the proximal end 30. That is, the fluid 66 may not force the sector shaft 18 to translate in a direction of arrow 156 during operation of the steering system 10.

Referring again to FIG. 3, the fluid 66 may not be flowable from the second cavity 60 to the first cavity 58 so that each of the plurality of gear teeth 122, 222, 322 (FIGS. 4A and 4B) is spaced apart from a respective one of the plurality of cogs 138, 238, 338, 438 (FIGS. 4A and 4B) as the steering wheel 12 (FIG. 1) rotates from the on-center position 14 (FIG. 4A) to the off-center position 16 (FIG. 4B). Further, the fluid 66 may not be flowable from the second cavity 60 to the first cavity 58 so that the center one 222 (FIG. 4A) of the plurality of gear teeth 122, 222, 322 meshes with the center one 240 (FIG. 4A) of the plurality of grooves 140, 240, 340 as the steering wheel 12 rotates from the off-center position 16 to the on-center position 14.

That is, referring now to FIGS. 4A and 4B, in operation, the center one 222 of the plurality of gear teeth 122, 222, 322 may mesh with the center one 240 of the plurality of grooves 140, 240, 340 to define a first gap 68 (FIG. 4A) having a first thickness 70 (FIG. 4A) between the center one 222 of the plurality of gear teeth 122, 222, 322 and one 238 of the plurality of cogs 138, 238, 338, 438 when the steering wheel 12 (FIG. 1) is disposed in the on-center position 14 (FIG. 4A). That is, the first thickness 70 may correspond to lash between the center one 222 of the plurality of gear teeth 122, 222, 322 and one 238 of the plurality of cogs 138, 238, 338, 438, and may be minimized by the steering system 10.

Further, referring to FIG. 4B, during operation of the steering system 10, the outer one 122 of the plurality of gear teeth 122, 222, 322 may mesh with the outer one 140 of the plurality of grooves 140, 240, 340 to define a second gap 72 having a second thickness 74 that is greater than the first thickness 70 (FIG. 4A) between the outer one 122 of the plurality of gear teeth 122, 222, 322 and the outer one 138 of the plurality of cogs 138, 238, 338, 438 when the steering wheel 12 (FIG. 1) is disposed in the off-center position 16. That is, the second thickness 74 may correspond to lash between the outer one 122 of the plurality of gear teeth 122, 222, 322 and the outer one 138 of the plurality of cogs 138, 238, 338, 438, and may be maintained, e.g., may not be minimized, by the steering system 10.

More specifically, as best shown in FIG. 3, the steering system 10 may also include the resilient member 34, e.g., a coil spring, disposed within the bore 28 of the sector shaft 18, and a washer 76 sandwiched between the resilient member 34 and the lash adjuster 48. That is, the lash adjuster 48 may be configured as a threaded bolt, and may compress the resilient member 34 and thereby decrease lash between the gear teeth 122, 222, 322 (FIGS. 4A and 4B) and cogs 138, 238, 338, 438 (FIGS. 4A and 4B) when the steering wheel 12 (FIG. 1) is disposed in the on-center position 14 (FIG. 4A), as set forth in more detail below.

With continued reference to FIG. 3, the steering system 10 may further include a retainer 78 disposed within the bore 28 and threadably mated to the lash adjuster 48 and configured for positioning the sector shaft 18 along the central longitudinal axis 24 as the steering wheel 12 (FIG. 1) rotates between the on-center position 14 (FIG. 4A) and the off-center position 16 (FIG. 4B). The retainer 78 may be disposed in contact with the sector shaft 18 at the proximal end 30, but may not rotate about the central longitudinal axis 24 as the sector shaft 18 rotates about the central longitudinal axis 24. Further, as best shown in FIG. 3, the lash adjuster 48 may have an annular shoulder 80 disposed in contact with the retainer 78, and the lash adjuster 48 may be rotatable with respect to the retainer 78.

In addition, referring to FIGS. 2 and 3, the steering system 10 may further include a nut 82 threadably matable with the lash adjuster 48 and abuttable with the end cap cover 50. That is, the nut 82 may be configured to retain the lash adjuster 48 within the aperture 54 along the central longitudinal axis 24. Therefore, rotation of the lash adjuster 48 may compress the resilient member 34 along the central longitudinal axis 24. More specifically, the lash adjuster 48 may be rotatable with respect to the end cap cover 50, e.g., in a direction indicated by arrow 56, to translate the washer 76 along the central longitudinal axis 24 towards the distal end 32, compress the resilient member 34 in the direction of arrow 156 (FIG. 3), and thereby decrease the first thickness 70 (FIG. 4).

In further detail, as described with continued reference to FIGS. 4A and 4B, the nut 82 may position the sector shaft 18 along the central longitudinal axis 24 with respect to the end cap cover 50, and thereby space each of the plurality of gear teeth 122, 222, 322 away from a respective one of the plurality of cogs 138, 238, 338, 438 as the steering wheel 12 (FIG. 1)

rotates from the on-center position 14 (FIG. 4A) to the off-center position 16 (FIG. 4B). That is, the lash adjuster 48 may be positioned so that each of the plurality of gear teeth 122, 222, 322 moves away from a respective one of the plurality of cogs 138, 238, 338, 438 to maintain the second thickness 74 (FIG. 4B). Therefore, the steering system 10 (FIG. 1) may maintain the second thickness 74 or lash between the outer gear tooth 122 and the outer cog 138 when the steering wheel 12 is disposed in the off-center position 16. Such lash or second gap 72 may subsequently assist an operator in turning the steering wheel 12 to again return the steering wheel 12 from the off-center position 16 to the on-center position 14. That is, because the steering system 10 maintains the second gap 72 (FIG. 4B), the plurality of gear teeth 122, 222, 322 may not bind up with respect to the plurality of cogs 138, 238, 338, 438 when the steering wheel 12 is rotated from the off-center position 16.

Conversely, with continued reference to FIGS. 4A and 4B, the lash adjuster 48 may also position the sector shaft 18 along the central longitudinal axis 24 with respect to the end cap cover 50, and thereby translate each of the plurality of gear teeth 122, 222, 322 towards the respective one of the plurality of cogs 138, 238, 338, 438 (FIG. 4A) as the steering wheel 12 (FIG. 1) rotates from the off-center position 16 (FIG. 4B) to the on-center position 14 (FIG. 4A). That is, each of the plurality of gear teeth 122, 222, 322 may move toward a respective one of the plurality of cogs 138, 238, 338, 438 to minimize the first thickness 70 (FIG. 4A). Therefore, the steering system 10 minimizes the first thickness 70 or lash between the center gear tooth 222 and the respective one 238 of the plurality of cogs 138, 238, 338, 438 when the steering wheel 12 is disposed in the on-center position 14. As such, the steering system 10 provides precise, substantially lash-free steering when the steering wheel 12 is disposed in the on-center position 14.

Stated differently, referring to FIGS. 2-4B, the nut 82, the end cap cover 50, the seal 62 (FIGS. 2 and 3), the lash adjuster 48, and the resilient member 34 (FIG. 3) may together suspend the sector shaft 18 along the central longitudinal axis 24 adjacent to the plurality of cogs 138, 238, 338, 438 (FIGS. 4A and 4B) to thereby minimize the first thickness 70 (FIG. 4A) when the steering wheel 12 (FIG. 1) is disposed in the on-center position 14 (FIGS. 1 and 4A), and may maintain the second thickness 74 (FIG. 4B) when the steering wheel 12 is disposed in the off-center position 16 (FIG. 4B). That is, as the nut 82 is turned, the lash adjuster 48 may compress the resilient member 34 so that the sector shaft 18 drops slightly and the center one 222 of the plurality of gear teeth 122, 222, 322 contacts the respective one 138, 238 of the plurality of cogs 138, 238, 338, 438 when the steering wheel 12 is disposed in the on-center position 14. Further, the seal 62 may ensure that no hydraulic pressure is exerted on the proximal end 30 of the sector shaft 18 in the direction of arrow 156 so that the sector shaft 18 may not drop along the central longitudinal axis 24 any further than specified by the position of the nut 82 and the lash adjuster 48. Therefore, the resilient member 34, the nut 82, the end cap cover 50, and the lash adjuster 48 may together properly position the sector shaft 18 along the central longitudinal axis 24 to minimize the first thickness 70 (FIG. 4B).

As further described with reference to FIGS. 4A and 4B, for the aforementioned embodiment including three gear teeth 122, 222, 322 protruding from the sector shaft 18 and four cogs 138, 238, 338, 438 protruding from the rack ball nut 36, when the steering wheel 12 (FIG. 1) is disposed in the on-center position 14 (FIG. 4A), the center one 222 of the three gear teeth 122, 222, 322 may mesh with the center one 240 of the three grooves 140, 240, 340 to define the first gap 68 (FIG. 4A) having the first thickness 70 (FIG. 4A) between the center one 222 of the three gear teeth 122, 222, 322 and one 238 of the four cogs 138, 238, 338, 438. However, when the steering wheel 12 is disposed in the off-center position 16 (FIG. 4B), the outer one 122 of the three gear teeth 122, 222, 322 may mesh with the outer one 140 of the three grooves 140, 240, 340 to define the second gap 72 (FIG. 4B) having the second thickness 74 (FIG. 4B) that is greater than the first thickness 70 between the outer one 122 of the three gear teeth 122, 222, 322 and the outer one 138 of the four cogs 138, 238, 338, 438.

Further, as described with continued reference to FIGS. 4A and 4B, the seal 62 separates the first cavity 58 from the second cavity 60 to ensure that the fluid 66 (FIG. 3) does not force the sector shaft 18 in the direction of arrow 156 (FIG. 3) as the steering wheel 12 (FIG. 1) rotates from the on-center position 14 (FIG. 4A) to the off-center position 16 (FIG. 4B). As such, each of the three gear teeth 122, 222, 322 may be properly spaced away from the respective one of the four cogs 138, 238, 338, 438 as the steering wheel 12 rotates from the on-center position 14 to the off-center position 16. Subsequently, when a steering maneuver is complete, the seal 62 may also ensure that each of the three gear teeth 122, 222, 322 translates towards the respective one of the four cogs 138, 238, 338, 438 as the steering wheel 12 rotates from the off-center position 16 to the on-center position 14. Further, the seal 62 may ensure that the sector shaft 18 may not drop along the central longitudinal axis 24 in the direction of arrow 156 (FIG. 3) away from the end cap cover 50 as the steering wheel 12 rotates from the off-center position 16 to the on-center position 14 to thereby minimize the first thickness 70 (FIG. 4A) and any lash perceived by a vehicle operator during on-center steering.

Therefore, the steering system 10 (FIG. 1) provides precise and efficient steering whether the steering wheel 12 (FIG. 1) is disposed in the on-center position 14 (FIG. 4A) or the off-center position 16 (FIG. 4B). That is, the steering system 10 maintains the sector shaft 18 in a desired vertical position along the central longitudinal axis 24 and provides for substantially lash-free on-center steering. Even as continuous cycling of the steering wheel 12 between the on-center position 14 and the off-center position 16 may wear the plurality of gear teeth 122, 222, 322 (FIGS. 4A and 4B) and/or the plurality of cogs 138, 238, 338, 438 (FIGS. 4A and 4B), the sector shaft 18 may continually align to the desired vertical position along the central longitudinal axis 24. Therefore, even at end-of-life operating conditions, an interface between the plurality of gear teeth 122, 222, 322 and plurality of cogs 138, 238, 338, 438 is substantially lash-free when the steering wheel 12 is disposed in the on-center position 14.

While the best modes for carrying out the disclosure have been described in detail, those familiar with the art to which this disclosure relates will recognize various alternative designs and embodiments for practicing the disclosure within the scope of the appended claims.

The invention claimed is:
1. A steering system for a vehicle, the steering system comprising:
   a steering wheel rotatable between an on-center position and an off-center position;
   a sector shaft having a plurality of gear teeth each protruding therefrom along a respective one of a plurality of gear axes, wherein the sector shaft has a proximal end defining a bore therein and is rotatable about a central longitudinal axis that is substantially perpendicular to each of the plurality of gear axes as the steering wheel rotates between the on-center position and the off-center position;
a rack ball nut having a plurality of cogs extending therefrom and defining a plurality of grooves therebetween, wherein each of the plurality of gear teeth is matable with a respective one of the plurality of grooves;
a lash adjuster translatable within the bore along the central longitudinal axis;
a resilient member disposed within the bore;
a washer sandwiched between the resilient member and the lash adjuster;
an end cap cover abutting the lash adjuster and spaced apart from the sector shaft to define a first cavity between the end cap cover and the sector shaft;
a housing abutting the end cap cover and spaced apart from the sector shaft to define a second cavity between the housing and the sector shaft;
a seal surrounding and abutting the sector shaft, wherein the seal separates the first cavity from the second cavity so that the first cavity is not disposed in fluid communication with the second cavity;
wherein the end cap cover defines an annular channel therein, and further wherein the seal is disposed within the annular channel; and
a fluid disposed in contact with the sector shaft and the rack ball nut within the second cavity;
wherein the fluid is not disposed within the first cavity and does not exert hydraulic pressure on the proximal end so that each of the plurality of gear teeth is spaced apart from a respective one of the plurality of cogs as the steering wheel rotates from the on-center position to the off-center position;
wherein a center one of the plurality of gear teeth meshes with a center one of the plurality of grooves to define a first gap having a first thickness between the center one of the plurality of gear teeth and one of the plurality of cogs when the steering wheel is disposed in the on-center position; and
wherein an outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position.

2. The steering system of claim 1, wherein the fluid is not disposed within the first cavity when the steering wheel is disposed in the on-center position.

3. The steering system of claim 1, wherein the fluid is not disposed within the first cavity when the steering wheel is disposed in the off-center position.

4. The steering system of claim 1, wherein the fluid is not flowable from the second cavity to the first cavity so that each of the plurality of gear teeth is spaced apart from a respective one of the plurality of cogs as the steering wheel rotates from the on-center position to the off-center position.

5. The steering system of claim 1, wherein the fluid is not flowable from the second cavity to the first cavity so that the center one of the plurality of gear teeth meshes with the center one of the plurality of grooves as the steering wheel rotates from the off-center position to the on-center position.

6. The steering system of claim 1, wherein the steering wheel rotates between the on-center position and the off-center position to translate the rack ball nut along an axis that is substantially perpendicular to the central longitudinal axis and thereby rotate the sector shaft about the central longitudinal axis.

7. The steering system of claim 1, further including a nut threadably matable with the lash adjuster and abuttable with the end cap cover, wherein the end cap cover is not rotatable about the central longitudinal axis.

8. The steering system of claim 7, wherein the lash adjuster is rotatable with respect to the end cap cover to translate the washer along the central longitudinal axis away from the proximal end, compress the resilient member, and thereby decrease the first thickness.

9. The steering system of claim 7, wherein the nut, the end cap cover, the seal, the lash adjuster, and the resilient member together suspend the sector shaft along the central longitudinal axis adjacent to the plurality of cogs to thereby minimize the first thickness when the steering wheel is disposed in the on-center position, and maintain the second thickness when the steering wheel is disposed in the off-center position.

10. A steering system for a vehicle, the steering system comprising:
a steering wheel rotatable between an on-center position and an off-center position;
a sector shaft having a plurality of gear teeth each protruding therefrom along a respective one of a plurality of gear axes, wherein the sector shaft has a proximal end defining a bore therein and is rotatable about a central longitudinal axis that is substantially perpendicular to each of the plurality of gear axes as the steering wheel rotates between the on-center position and the off-center position;
a rack ball nut having a plurality of cogs extending therefrom and defining a plurality of grooves therebetween, wherein each of the plurality of gear teeth is matable with a respective one of the plurality of grooves;
a lash adjuster translatable within the bore along the central longitudinal axis;
a resilient member disposed within the bore;
a washer sandwiched between the resilient member and the lash adjusters;
an end cap cover abutting the lash adjuster and spaced apart from the sector shaft to define a first cavity between the end cap cover and the sector shaft;
a housing abutting the end cap cover and spaced apart from the sector shaft to define a second cavity between the housing and the sector shaft;
a seal surrounding and abutting the sector shaft, wherein the seal separates the first cavity from the second cavity so that the first cavity is not disposed in fluid communication with the second cavity; and
a fluid disposed in contact with the sector shaft and the rack ball nut within the second cavity;
wherein the fluid is not disposed within the first cavity and does not exert hydraulic pressure on the proximal end so that each of the plurality of gear teeth is spaced apart from a respective one of the plurality of cogs as the steering wheel rotates from the on-center position to the off-center position;
wherein a center one of the plurality of gear teeth meshes with a center one of the plurality of grooves to define a first gap having a first thickness between the center one of the plurality of gear teeth and one of the plurality of cogs when the steering wheel is disposed in the on-center position, and
wherein an outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position.

11. The steering system of claim 10, further including a nut threadably matable with the lash adjuster and abuttable with the end cap cover, wherein the end cap cover is not rotatable about the central longitudinal axis.

12. The steering system of claim 11, wherein the lash adjuster is rotatable with respect to the end cap cover to translate the washer along the central longitudinal axis away from the proximal end, compress the resilient member, and thereby decrease the first thickness.

13. The steering system of claim 11, wherein the nut, the end cap cover, the seal, the lash adjuster, and the resilient member together suspend the sector shaft along the central longitudinal axis adjacent to the plurality of cogs to thereby minimize the first thickness when the steering wheel is disposed in the on-center position, and maintain the second thickness when the steering wheel is disposed in the off-center position.

14. The steering system of claim 10, wherein the steering wheel rotates between the on-center position and the off-center position to translate the rack ball nut along an axis that is substantially perpendicular to the central longitudinal axis and thereby rotate the sector shaft about the central longitudinal axis.

15. The steering system of claim 10, wherein the fluid is not flowable from the second cavity to the first cavity.

16. A vehicle comprising:
an axle;
a plurality of wheels each rotatable about the axle; and
a steering system configured for pivoting the axle to thereby steer the plurality of wheels, the steering system including:
  a steering wheel rotatable between an on-center position and an off-center position;
  a sector shaft having a plurality of gear teeth each protruding therefrom along a respective one of a plurality of gear axes, wherein the sector shaft has a proximal end defining a bore therein and is rotatable about a central longitudinal axis that is substantially perpendicular to each of the plurality of gear axes as the steering wheel rotates between the on-center position and the off-center position;
  a rack ball nut having a plurality of cogs extending therefrom and defining a plurality of grooves therebetween, wherein each of the plurality of gear teeth is matable with a respective one of the plurality of grooves;
  a lash adjuster translatable within the bore along the central longitudinal axis;
  a resilient member disposed within the bore;
  a washer sandwiched between the resilient member and the lash adjuster;
  an end cap cover abutting the lash adjuster and spaced apart from the sector shaft to define a first cavity between the end cap cover and the sector shaft;
  a housing abutting the end cap cover and spaced apart from the sector shaft to define a second cavity between the housing and the sector shaft;
  a seal surrounding and abutting the sector shaft, wherein the seal separates the first cavity from the second cavity so that the first cavity is not disposed in fluid communication with the second cavity; and
  a fluid disposed in contact with the sector shaft and the rack ball nut within the second cavity;
  wherein the fluid is not disposed within the first cavity and does not exert hydraulic pressure on the proximal end so that each of the plurality of gear teeth is spaced apart from a respective one of the plurality of cogs as the steering wheel rotates from the on-center position to the off-center position;
  wherein a center one of the plurality of gear teeth meshes with a center one of the plurality of grooves to define a first gap having a first thickness between the center one of the plurality of gear teeth and one of the plurality of cogs when the steering wheel is disposed in the on-center position; and
  wherein an outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position.

17. The steering system of claim 16, further including a nut threadably matable with the lash adjuster and abuttable with the end cap cover, wherein the end cap cover is not rotatable about the central longitudinal axis.

18. The steering system of claim 17, wherein the lash adjuster is rotatable with respect to the end cap cover to translate the washer along the central longitudinal axis away from the proximal end, compress the resilient member, and thereby decrease the first thickness.

19. The steering system of claim 17, wherein the nut, the end cap cover, the seal, the lash adjuster, and the resilient member together suspend the sector shaft along the central longitudinal axis adjacent to the plurality of cogs to thereby minimize the first thickness when the steering wheel is disposed in the on-center position, and maintain the second thickness when the steering wheel is disposed in the off-center position.

20. The steering system of claim 16, wherein the steering wheel rotates between the on-center position and the off-center position to translate the rack ball nut along an axis that is substantially perpendicular to the central longitudinal axis and thereby rotate the sector shaft about the central longitudinal axis.

* * * * *